US009318978B2

(12) United States Patent
Braz

(10) Patent No.: US 9,318,978 B2
(45) Date of Patent: Apr. 19, 2016

(54) VOLTAGE CONVERTER WITH SOFT COMMUNICATION NETWORKS

(71) Applicant: Infineon Technologies Austria AG, Villach (AT)

(72) Inventor: Cesar Augusto Braz, Villach (AT)

(73) Assignee: Infineon Technologies Austria AG, Villach (AT)

( * ) Notice: Subject to any disclaimer, the term of this patent is extended or adjusted under 35 U.S.C. 154(b) by 231 days.

(21) Appl. No.: 14/041,993

(22) Filed: Sep. 30, 2013

(65) Prior Publication Data

US 2015/0092457 A1 Apr. 2, 2015

(51) Int. Cl.
H02M 3/335 (2006.01)
H02M 7/5387 (2007.01)
H02M 1/00 (2007.01)

(52) U.S. Cl.
CPC ........ *H02M 7/5387* (2013.01); *H02M 3/33584* (2013.01); *H02M 2001/0058* (2013.01)

(58) Field of Classification Search
CPC ................................................ H02M 3/33507
See application file for complete search history.

(56) References Cited

U.S. PATENT DOCUMENTS

| 4,611,267 | A | * | 9/1986 | McMurray | .......... | H02M 7/5155 363/27 |
| 6,304,461 | B1 | * | 10/2001 | Walker | ............................ | 363/17 |
| 6,473,318 | B1 | * | 10/2002 | Qian et al. | ................. | 363/21.16 |
| 7,606,051 | B1 | * | 10/2009 | Wittenbreder, Jr. | ............. | 363/39 |
| 7,869,235 | B2 | * | 1/2011 | Lin et al. | ..................... | 363/56.11 |
| 8,009,448 | B2 | * | 8/2011 | Liu | ............................. | 363/56.12 |
| 8,456,865 | B1 | * | 6/2013 | Bianchi et al. | .................. | 363/17 |
| 8,547,711 | B2 | * | 10/2013 | Reddy | ........................ | 363/21.02 |
| 2008/0205109 | A1 | * | 8/2008 | Darroman et al. | ............ | 363/132 |
| 2009/0024255 | A1 | * | 1/2009 | Penzenstadler et al. | ...... | 700/297 |
| 2012/0127762 | A1 | | 5/2012 | Reddy | | |
| 2012/0290145 | A1 | | 11/2012 | Joshi et al. | | |

OTHER PUBLICATIONS

Hancock, J., et al., "Applications Key in Selecting Super-Junction MOSFETs," Power Electronics Technology, Nov. 2010, pp. 14-17.
Joshi, M., et al., "A High-Efficiency Resonant Solar Micro-Inverter," Proceedings of the 2011-14th European Conference on Power Electronics and Applications, Aug. 30, 2011-Sep. 1, 2011, pp. 1-10.
Lin, B., et al., "Analysis, design and implementation of an active clamp flyback converter," International Conference on Power Electronics and Drives Systems, 2005, pp. 424-429, vol. 1.
(Continued)

*Primary Examiner* — Emily P Pham
(74) *Attorney, Agent, or Firm* — Slater Matsil, LLP

(57) ABSTRACT

Embodiments of the present invention describe a voltage converter and a method for operating the voltage converter. In one embodiment the voltage converter includes a primary path configured to generate a pulse modulated voltage or current from an input direct current (DC) voltage, a transformer arrangement with m≥1 primary windings and n≥2 secondary windings inductively coupled together, the m primary windings being connected to the primary path, and a secondary path configured to output a pulsed direct current (DC) voltage or current, wherein the secondary path includes n capacitors connected in series and n secondary controllable semiconductor switches, and each of the n secondary windings is connected via at least one of the secondary controllable semiconductor switches to at least one of the capacitors.

16 Claims, 2 Drawing Sheets

(56) References Cited

OTHER PUBLICATIONS

Watson, R., et al., "Characterization of an Active Clamp Flyback Topology for Power Factor Correction Applications," IEEE Transactions on Power Electronics, Jan. 1996, pp. 191-198, vol. 11, No. 1.

Jang, J., et al., "Soft Switching Control Method for Photovoltaic AC Module Flyback Inverter using Synchronous Rectifier," The Transactions of Korean Institute of Power Electronics, 18(4), Aug. 2013, 11 pages.

* cited by examiner

VOLTAGE CONVERTER WITH SOFT COMMUNICATION NETWORKS

TECHNICAL FIELD

The disclosure relates to a voltage converter, in particular a bidirectional voltage converter.

BACKGROUND

A flyback converter is used in both alternating current (AC) to direct current (DC) and DC to DC conversion with galvanic isolation between the input and the output. Galvanic isolation and voltage conversion is achieved by a transformer whose primary winding is alternately connected to and disconnected from an input voltage source and whose secondary winding supplies an output voltage to an output capacitor via a rectifying diode. There are two states of a flyback converter in operation. In an on-state, the energy is transferred from the input voltage source to the transformer and the output capacitor supplies energy to an output load. In an off-state, the energy is transferred from the transformer to the output capacitor load and the output load. A common flyback converter as outlined above cannot provide reactive power, i.e., positive voltage with negative current, or negative voltage with positive current, because of the output diode, which blocks the current in one direction.

A bidirectional flyback converter can provide reactive power because the (high-voltage) diode is replaced by a (high-voltage) switch that allows for current flow in both directions. In bidirectional flyback converters, metal oxide semiconductor field-effect transistors (MOSFET) are commonly employed as high-voltage switches. However, high-voltage MOSFETs have higher on-state resistances than those of low voltage MOSFETs and the maximum voltage for high-voltage MOSFETS is 1,000 Volts (V). Therefore, there is a need for an improved high-voltage bidirectional flyback converter with MOSFETs.

SUMMARY OF THE INVENTION

A voltage converter according to an embodiment of the invention comprises a primary path configured to generate a pulse modulated voltage from an input DC voltage; a transformer arrangement with $m \geq 1$ primary windings and $n \geq 2$ secondary windings inductively coupled together, the m primary windings being connected to the primary path; and a secondary path configured to output a pulsed DC voltage; wherein the secondary path comprises n capacitors connected in series and n secondary controllable semiconductor switches; and each of the n secondary windings is connected via at least one of the secondary controllable semiconductor switches to at least one of the capacitors.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF ILLUSTRATIVE EMBODIMENTS

Figure 1:
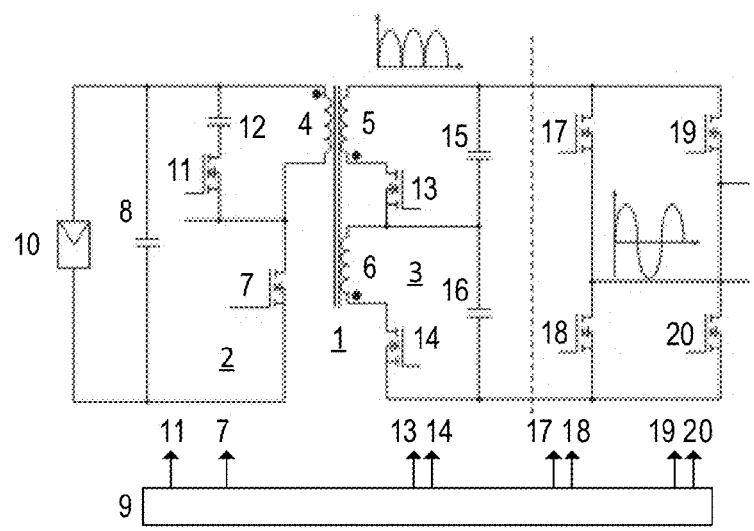
FIG. 1 is a circuit diagram of a bidirectional flyback switched mode converter with reactive power capability using lower voltage semiconductor switches.

A bidirectional flyback switched mode converter with reactive power capability according to an embodiment of the invention is schematically illustrated in FIG. 1. The converter of FIG. 1 includes a transformer 1 with a primary side which forms part of a primary path 2 and a secondary side which forms part of a secondary path 3. The primary side has a primary winding 4 and the secondary side has two secondary windings 5 and 6. Furthermore, the primary path 2 includes a controllable switch 7, in the present example a MOSFET, such as an N-type depletion mode MOSFET (NMOSFET), a capacitor 8 and a control circuit 9 for controlling the switch 7. Switch 7 and primary winding 4 are connected in series and the series connection is connected in parallel to capacitor 8. In the present example, capacitor 8 transforms a current supplied by a DC current source 10, such as a photovoltaic element, into a DC voltage so that DC current source 10 and capacitor form a DC voltage source. This DC voltage is chopped by switch 7 and supplied to primary winding 4.

Primary path 2 further includes a switch 11, e.g., an NMOSFET controlled by control circuit 9 and a capacitor 12 which are connected in series and as series connection in parallel to the primary winding 4 of transformer 1. When switch 7 is turned off, switch 11 is turned on. The leakage energy is transferred to the capacitor 12 through switch 11, and the voltage across capacitor 12 is used to reset transformer 1. As a result, the voltage across switch 7 is clamped.

Secondary path 3 includes beside the two secondary windings 5 and 6 two switches 13 and 14, e.g., NMOSFETs controlled by control circuit 9, each of which is connected in series to one of the secondary windings 5 and 6. Secondary path 3 further includes two capacitors 15 and 16, connected in series. Capacitor 15 is connected in parallel to the series connection of switch 13 and secondary winding 5 and capacitor 16 is connected in parallel to the series connection of switch 14 and secondary winding 6. Switch 7 is controlled to provide sine pulse width modulation in order to generate 50 Hz (or 60 Hz) rectified sinusoidal currents in the secondary windings 5 and 6 and the corresponding switches 13 and 14. FIG. 1 shows above winding 5, a voltage-time diagram of the rectified sinusoidal current on the secondary side. Whenever switch 7 is on, switches 13 and 14 are off, and vice versa. Switches 13 and 14 work as active diodes with reduced conduction losses. The capacitors 15 and 16 have sufficiently small capacity so that the shape of the currents is not distorted. The objective is to divert the high-frequency carrier current pulses and smooth the current to its intended frequency: 50 Hz or 60 Hz. Switch 11, along with capacitor 12 and the leakage inductance of transformer 1, form a soft-switching network to promote soft switching (zero-voltage switching) of switch 7 (loss less turn on).

In order to provide a DC-AC conversion, the pulsed DC voltage over the series connection of capacitors 15 and 16 is unfolded by a switching H-bridge that alternately outputs the pulses inverted and non-inverted. The H-bridge comprises four switches 17-20, e.g., NMOSFETs, controlled by control circuit 9, in bridge configuration with one of the switches 17-20 in each leg of the H-structure. A bridge structure is a type of electrical circuit in which two circuit branches in parallel with each other are "bridged" by a third branch, e.g., a load connected between the first two branches at some intermediate point along them, the intermediate point separates two legs per branch from each other. Switches 17-20, which unfold the rectified current to an AC current without DC level, are controlled to enable a voltage or current to be applied across a load in either direction, wherein the switches in one branch are never closed at the same time.

The bidirectional flyback converter illustrated in FIG. 1 may form the basis for a solar micro-inverter with reactive power capability. For example, the flyback converter's secondary path has been modified in order to be able to absorb the negative current by replacing the rectifying diode with high-voltage MOSFETs 13 and 14. The secondary winding has been split in two windings, which divide the output voltage by two allowing, for example, 650V voltage-class MOSFETs to be used as synchronous rectifiers in a 1,200V secondary path. Auxiliary switch 11 and clamping capacitor 12, with the leakage inductance of the transformer 1, form an active-clamp network which provides zero-voltage switching (ZVS) turn-on to switch 7.

In the present example, ZVS works as follows. Every time switch 7 opens, the energy in the transformer leakage inductance is stored into capacitor 12, storing a voltage higher than that in winding 4. Before every time the switch 7 is turned on, the switch 11 is turned on first, for a small period of time, and the voltage in capacitor 11 plus the input voltage is applied to winding 4. The difference between this applied voltage and the reflected voltage in winding 4 is then applied onto the leakage inductance. Then a current flows through the leakage inductance with direction into winding 4. The switch 11 is then turned off and the current flowing in the leakage inductance discharges the output charge (Qoss) of switch 7, forcing the voltage between switch 7 and primary winding 4 to swing to zero. Once the drain voltage is zero, the switch 7 is turned on with zero-voltage switching.

In reactive power, switches 13 and 14 operate as controlling switches and switch 7 operates as an active diode. Energy flows from the output to the input. The modulation scheme applied to the switches 13 and 14 may also be sine pulse width modulation.

Figure 2:
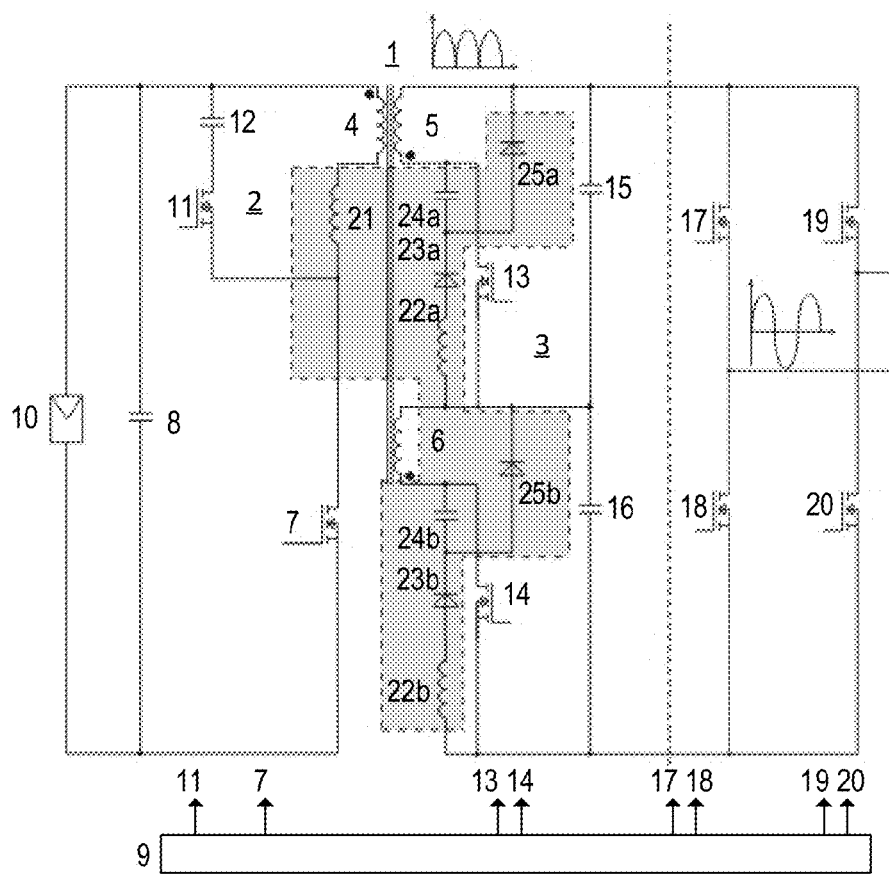
FIG. 2 is a circuit diagram of a bidirectional flyback switched mode converter according to FIG. 1 with additional soft commutation networks.

Referring now to the converter shown in FIG. 2, in which circuitry (indicated by a darkened area) that controls commutation has been added to the flyback converter shown in FIG. 1. The circuitry includes an inductor 21 connected in series to the primary winding (e.g., the already present inductance of the primary winding) and two soft commutation networks coupled with the secondary windings. Each soft commutation network may include a series connection of a commutation inductance 22a or 22b, a first commutation diode 23a or 23b, and a commutation capacitor 24a or 24b, the series connection being connected in parallel to the respective secondary controllable semiconductor switch 13 or 14 and the commutation inductance commutation being connected to the node between the secondary controllable semiconductor switch 13 or 14 and the respective one of the n capacitors 15 and 16. A second commutation diode 25a or 25b may be connected between the node between the first commutation diode 23a or 23b and the commutation capacitor 24a or 24b, and the node between the respective secondary winding 5 or 6 and the respective one of the n capacitors 15 and 16.

A high-voltage MOSFET has a higher reverse recovery charge (Qrr) and a higher output charge (Qoss) than, for example, a Silicon Carbide junction field effect transistor (JFET). When the converter is operated in continuous current mode (CCM), Qoss and Qrr may increase the turn-on losses of switch 7. Moreover, secondary side high-voltage MOSFETs may be subject to hard commutation of their body diodes every time switch 7 is turned on, which, at high frequencies, may cause the destruction of these devices.

The soft commutation network described above in connection with FIG. 2 overcomes the above-mentioned issues. Inductor 21 serves two purposes here. It provides ZVS to switch 7, just as in the active-clamp topology with switch 11 and capacitor 12, and promotes soft commutation of the body diodes of the high-voltage MOSFETs. During the soft commutation of the body diodes, the additional current required to recover their Qrr and charge the high-voltage MOSFETs Qoss is trapped in inductance 21. Diodes 23a and 23c, along with capacitors 24a and 24b, provide a path and storage, respectively, through transformer 1, to the trapped energy in inductance 21. As switch 7 opens, the energy associated to Qrr and Qoss, now stored in capacitors 24a and 24b, is then sent back to the output through diodes 25a and 25b, prior to the high-voltage MOSFETs conduction. During the reactive-power processing mode inductors 22a and 22b provide zero-current turn-on to switches 13 and 14.

As described above, the micro-inverter illustrated in FIG. 2 includes a bidirectional flyback converter with a voltage-clamp network (switch 11, clamping capacitor 12 and inductor 21, to provide ZVS to switch 7. The converter secondary side may use two (or more) identical secondary winding circuits (soft commutation networks) connectable in series by switches 13 and 14, which work as either synchronous rectifier switches, when processing active power, or as control switches, when processing reactive power, when switch 7 works as a synchronous rectifier. The secondary winding circuits are series connected in order to match, for example, the mains high voltage and yet utilize lower voltage MOSFETs (650V) than what would otherwise be required of a single output stage, e.g., a 1,200V switch. The soft commutation networks soften the commutation of the high-voltage MOSFETs body diodes, avoiding their destruction. The energy related to this soft commutation (associated with Qrr and Qoss of the high-voltage MOSFETs), initially trapped in inductance 21, is recovered and stored in capacitors 24a and 24b, and then sent to the output once switch 7 opens.

Figure 3:
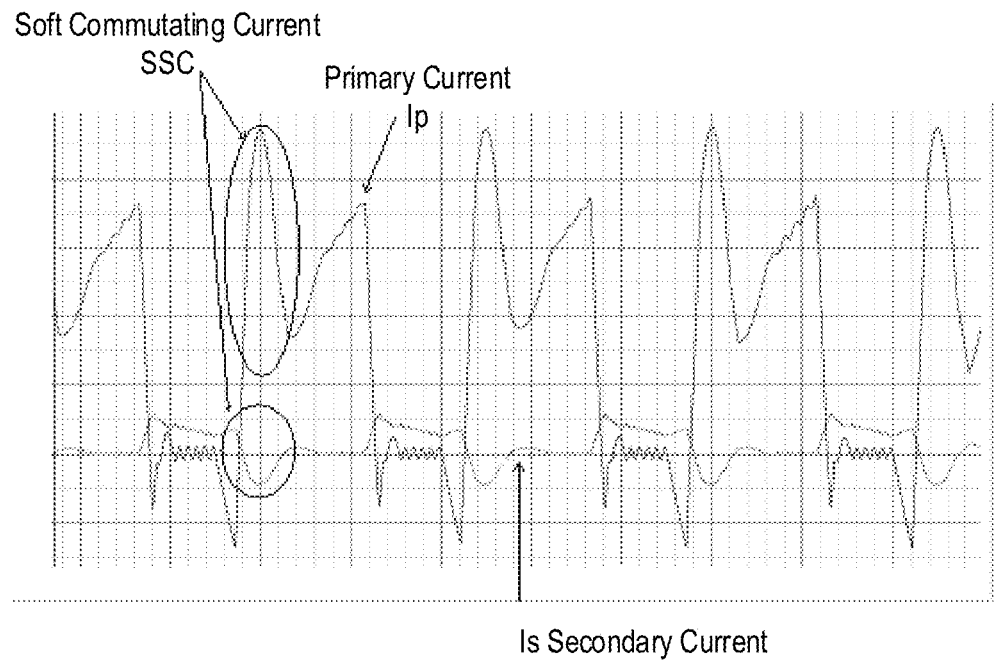
FIG. 3 is a diagram illustrating a primary current, a secondary current and a soft commutation current over time.

FIG. 3 shows simulation results as current I over time t for the transformer primary current Ip and secondary current Is, highlighting the current related to Qrr and Qoss of the high-voltage MOSFETs, i.e., soft commutation current Scc.

Figure 4:
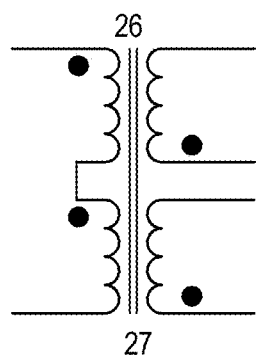
FIG. 4 is an alternative transformer structure with two transformers whose primary windings are connected in series.
Figure 5:
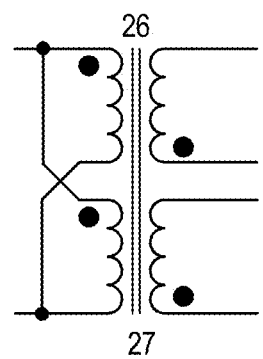
FIG. 5 is an alternative transformer structure with two transformers whose primary windings are connected in parallel.

FIGS. 4 and 5 illustrate transforming circuits that may substitute the transformer 1. In the circuit shown in FIG. 4 two transformers 26 and 27 are employed which have each one primary winding and one secondary winding, wherein the primary windings of transformers 26 and 27 are connected in series. In the circuit shown in FIG. 5 the primary windings of two transformers 26 and 27 are connected in parallel. However, any other constellations with different numbers of transformers, different numbers of primary windings, different numbers of secondary windings and different connection structure are applicable as well.

The converters described above could be used both for AC-DC and DC-DC power conversion. It is suitable for applications in the low power as well as the high power range. Any switch, inductor, diode or capacitor device can be substituted by a number of respective devices, which may be connected in parallel or in series. Primary and secondary control may be independently of one another, or depended from each other, e.g., performed by a multiplicity of controllers or only a single controller (as shown). In the examples described above, control circuit 9 provides control signals for all switches. Switches 7, 13 and 14 may be controlled as in common bidirectional flyback converters and switches 17-20 may be controlled as in common H-bridge circuits.

Instead of MOSFETs based on silicon material, transistors using wide-band gap material such as gallium nitride, silicon carbide, zinc oxide, any other suitable material may be employed.

Referring again to FIG. 1, the converter shown can simply be operated as a DC/DC converter by omitting the unfolding bridge (switches 17-20) and using the respective terminals of capacitors 15 and 16 for connecting a DC load (or a high voltage battery). For step-up DC/DC converters, the input source 10 could be a DC current source, such as a photovoltaic panel, or voltage sources, such as a battery or battery banks, or fuel cells.

In DC/DC converter applications the output capacitors 15 and 16 are bigger than that of the micro-inverter outlined above to have a constant voltage source at the output, with little ripple, whereas in the micro-inverter application the purpose of such capacitors is to divert the high-frequency current from the output, that would just receive the 50 Hz or 60 Hz current.

Furthermore, other variations and alternatives are possible as well. For example, as will be obvious to those of ordinary skill in the art, other circuit elements can be added to, or be used as substitutes in, the specific circuit embodiments discussed above, such as other types of switching means, other types of control units, etc. Furthermore, the invention may be used in a large range of different applications.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A voltage converter comprising:
    a primary path configured to generate a pulse modulated voltage or current from an input direct current (DC) voltage;
    a transformer arrangement with m≥1 primary windings and n≥2 secondary windings inductively coupled together, the m primary windings being connected to the primary path; and
    a secondary path configured to output a pulsed direct current (DC) voltage or current, wherein the secondary path comprises n capacitors connected in series and n secondary controllable semiconductor switches, and wherein each of the n secondary windings is connected via at least one of the secondary controllable semiconductor switches to at least one of the capacitors; and
    n soft commutation networks, each connected in parallel to one of the n secondary controllable semiconductor switches, wherein each of the n soft commutation networks comprises:
        a series connection of a commutation inductance, a first commutation diode and a commutation capacitor, the series connection being connected in parallel to the respective secondary controllable semiconductor switch and the commutation inductance being connected to a node between the secondary controllable semiconductor switch and the respective one of the n capacitors; and
        a second commutation diode connected between the node between the first commutation diode and the commutation capacitor, and the node between the respective secondary winding and the respective one of the n capacitors.

2. The voltage converter of claim 1, wherein the transformer arrangement comprises one transformer with m primary windings and n secondary windings.

3. The voltage converter of claim 1, wherein the transformer arrangement comprises m transformers, each with one primary winding and one secondary winding.

4. The voltage converter of claim 1, wherein, for m≥1, the m primary windings are connected in series or in parallel or partly in series and partly in parallel.

5. The voltage converter of claim 1, wherein at least one of the controllable semiconductor switches is a metal oxide semiconductor field-effect transistor (MOSFET), or a transistor using wide-band gap material.

6. The voltage converter of claim 1, further comprising a circuit structure that is configured to generate a bidirectional power flow between the secondary path and the primary path.

7. The voltage converter of claim 6, wherein the circuit structure is a flyback structure.

8. The voltage converter of claim 1, wherein the secondary path is configured to generate an alternating current (AC) voltage that comprises a reactive power component and an active power component.

9. The voltage converter of claim 8, wherein the secondary path comprises four further controllable semiconductor switches in a H-bridge configuration to unfold the pulsed DC current into an AC current.

10. The voltage converter of claim 1, wherein the pulsed DC voltage has a peak voltage of at least 1,000 Volts.

11. The voltage converter of claim 1, wherein the primary path comprises a first primary controllable semiconductor switch that is configured to switch a single primary winding to the input DC voltage.

12. The voltage converter of claim 11, wherein a primary inductance is connected in series to the first primary controllable semiconductor switch.

13. The voltage converter of claim 1, wherein the primary path comprises a first primary controllable semiconductor switch that is configured to switch the primary windings to the input DC voltage.

14. The voltage converter of claim 13, wherein a primary inductance is connected in series to the first primary controllable semiconductor switch.

15. The voltage converter of claim 1, wherein the primary path comprises a second primary controllable semiconductor switch that is configured to switch a primary capacitor in parallel to a single primary winding.

16. The voltage converter of claim 1, wherein the primary path comprises a second primary controllable semiconductor switch that is configured to switch a primary capacitor in parallel to a plurality of primary windings.

* * * * *